(12) United States Patent
Otsuka et al.

(10) Patent No.: US 6,330,448 B1
(45) Date of Patent: Dec. 11, 2001

(54) HANDOVER ARRANGEMENT FOR MOBILE STATION MOVING ACROSS THE BOUNDARY OF WIRELESS CELL-SITE STATIONS OF ADJACENT PBXS

(75) Inventors: Kiyokazu Otsuka; Yoshio Itagaki, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/292,949

(22) Filed: Apr. 16, 1999

(30) Foreign Application Priority Data

Apr. 16, 1998 (JP) .................................................. 10-106576

(51) Int. Cl.⁷ ...................................................... H04Q 7/20
(52) U.S. Cl. .......................... 455/436; 455/437; 455/439; 455/555
(58) Field of Search ...................................... 455/432, 434, 455/435, 436, 439, 437, 525, 554, 555, 560, 561, 411, 422, 414, 550

(56) References Cited

U.S. PATENT DOCUMENTS

| 5,329,573 | * | 9/1997 | Chang et al. .......................... 379/58 |
| 5,353,281 | * | 10/1994 | Kuwahara et al. .................. 370/38.1 |
| 5,473,669 | * | 12/1995 | Kanada et al. .......................... 379/59 |
| 5,542,098 | * | 9/1997 | Bonta ................................... 455/33.2 |
| 5,659,878 | * | 8/1997 | Uchida et al. ......................... 455/426 |
| 5,670,950 | * | 9/1997 | Otsuka ............................. 340/825.33 |
| 5,761,620 | * | 6/1998 | Furuya et al. ......................... 455/435 |
| 5,920,818 | * | 7/1999 | Frodigh et al. ....................... 455/443 |
| 5,999,810 | * | 12/1999 | Fuentes ................................ 455/422 |
| 5,999,813 | * | 12/1999 | Fuentes ................................ 455/422 |
| 6,169,797 | * | 1/2001 | Wildgrube et al. .................. 379/233 |

FOREIGN PATENT DOCUMENTS 9-247743   9/1997   (JP) .

* cited by examiner

*Primary Examiner*—William Trost
*Assistant Examiner*—Congvan Tran
(74) *Attorney, Agent, or Firm*—Sughrue, Mion, Zinn, Macpeak & Seas, PLLC

(57) ABSTRACT

In a PBX network, a global database is provided in each PBX node for storing shared data for verification of authorized mobile stations when accessing the network via a wireless cell-site station. During a wireless mode, a mobile station monitors the strength of its downlink signal from a first cell-site station of a first PBX node. If it falls below a threshold, the mobile station begins a scan across the spectrum. If a strong signal is detected, it stops the scan and transmits a handover request message to a second cell-site station transmitting that strong signal. The second node receives the message via the second cell-site station to establish the mobile's verification. If the mobile station is an authorized user, the second node transmits a handover grant message to the second cell-site station, transmits a command message to the first node for a switchover to a link between the first and second nodes, and connects the link to the second cell-site station.

6 Claims, 5 Drawing Sheets

FIG. 2B

LOCAL DATABASE

| MA₁₁ | PCN | ERN | CSN |
|---|---|---|---|
| MA₁₂ | PCN | ERN | CSN |
| ---- | ---- | ---- | ---- |
| MA₃ₙ | PCN | ERN | CSN |

FIG. 2A

GLOBAL DATABASE

| PLN | PCN + ERN + CSN | | | |
|---|---|---|---|---|
| PLN | PCN + ERN + CSN | | | |
| PLN | PCN + ERN + CSN | | | |
| PBX_A | MA_{A1} | MA_{A2} | MA_{A3} ---- | MA_{AL} |
| PBX_B | MA_{B1} | MA_{A2} | MA_{A3} ---- | MA_{BM} |
| PBX_C | MA_{C1} | MA_{C2} | MA_{C3} ---- | MA_{CN} |

LEGEND:
PLN = PBX LINE NUMBER (NETWORKWIDE UNIQUE)
MA = MOBILE'S ADDRESS

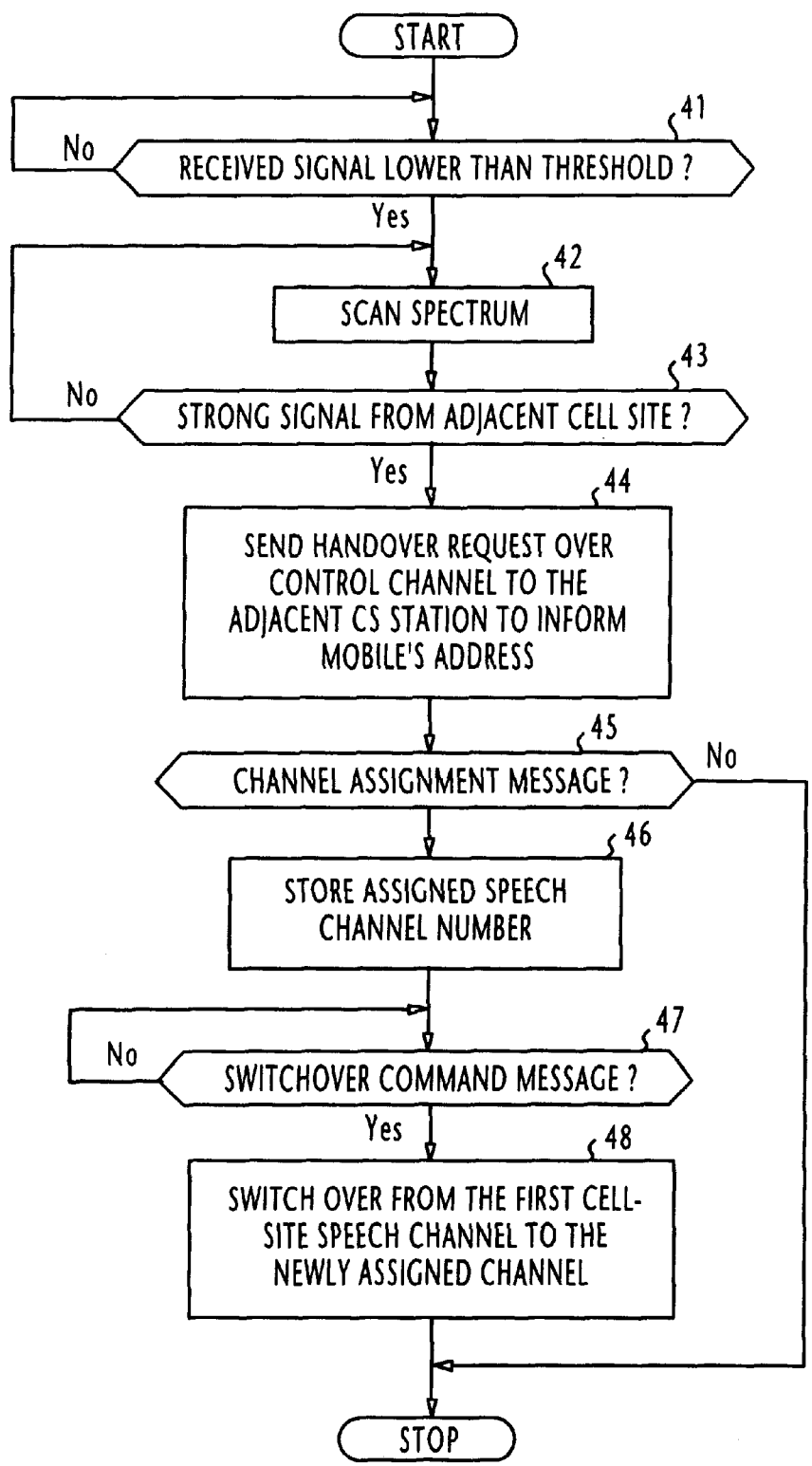

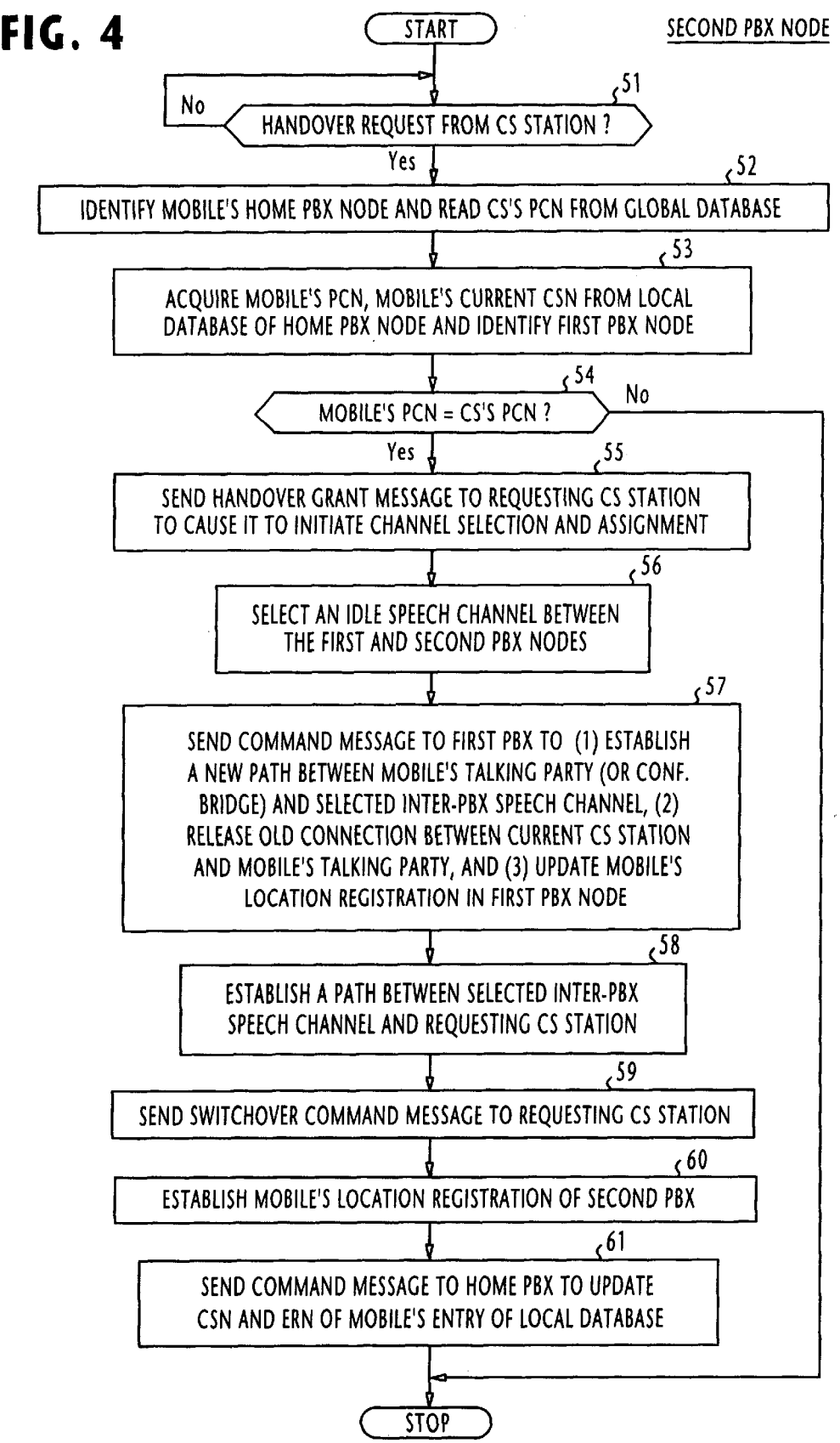

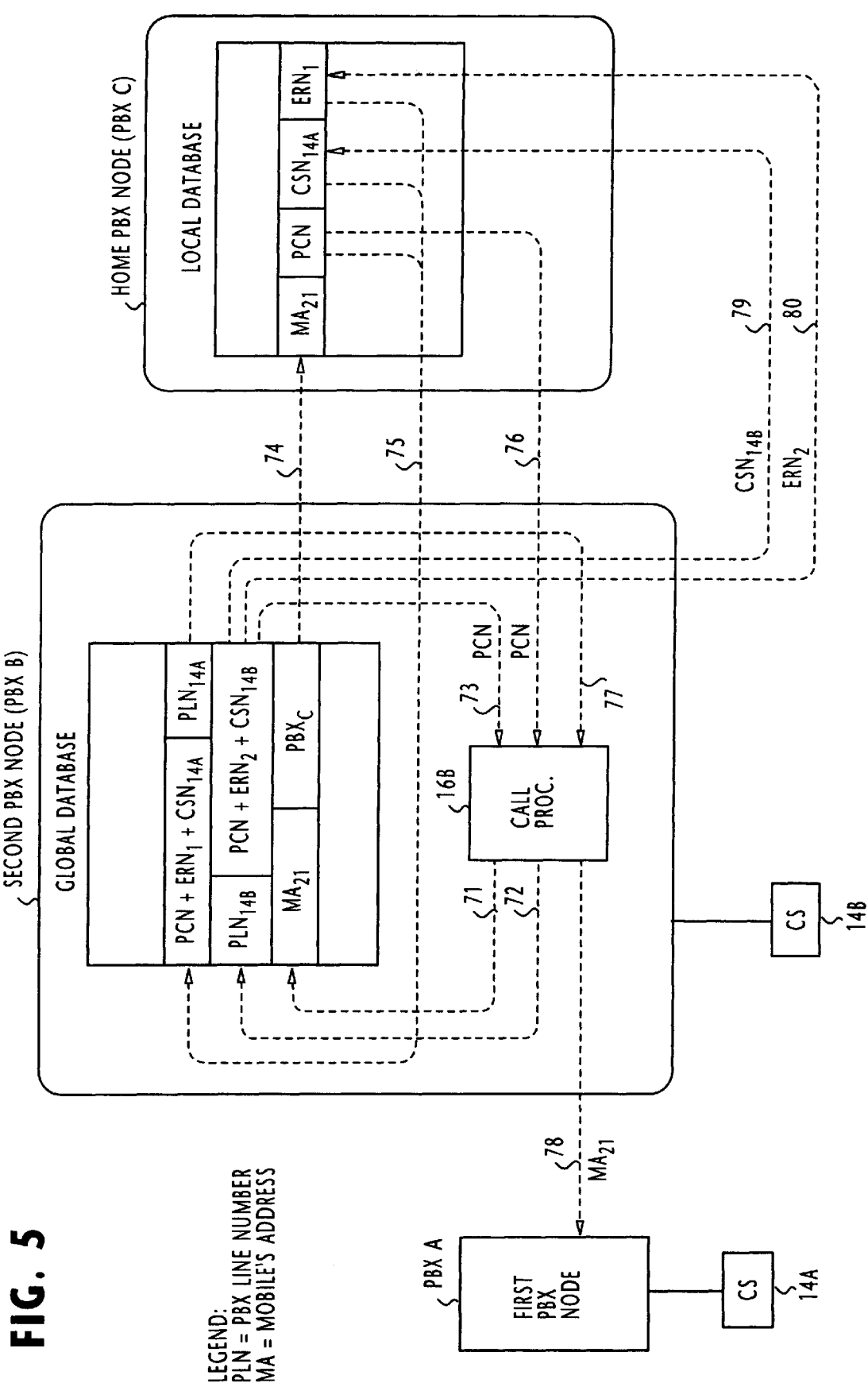

HANDOVER ARRANGEMENT FOR MOBILE STATION MOVING ACROSS THE BOUNDARY OF WIRELESS CELL-SITE STATIONS OF ADJACENT PBXS

BACKGBOUND OF THE INVENTION

1. Field of the invention

The present invention relates generally to cellular mobile communications systems, and more specifically to a communications network in which a number of private branch exchanges (PBXs) are interconnected and each PBX accommodates a number of wireless cell-site stations for serving handheld personal mobile stations.

2. Description of the Related Art

In conventional PBX networks where wireless cell-site stations are provided, mobile stations are allowed to establish communication within the area of a PBX if their system identifiers are verified. Handover operation is effected when a communicating mobile station moves from one cell site to another only if the mobile station remains within the area of the PBX in which it is verified. When a mobile station belonging to a first PBX moves to the area of a second PBX where it is not verified, the mobile station is required to use the system identifier of the second PBX if it establishes a communication. Therefore, if a communicating mobile station of the first PBX moves around and enters the area of the second PBX and wishes to continue the communication, the mobile station is required to interrupt the communication by sending an on-hook signal to the first PBX and re-originate a call through the second PBX to the first PBX by sending an off hook signed to the second PBX containing the system identifier of the second PBX.

Therefore, a need exists to provide a handover operation that allows a communicating mobile station of a PBX node to continue communication without interruption when it enters the area of an adjacent PBX node.

SUMMARY OF THE INVENTION

It is therefore an object of the present invention to provide a network of interconnected private branch exchanges having celi-site stations, wherein each PBX provides handover operation for a communicating mobile station moving from one PBX cell-site station to another PBX cell-site station.

According to a first aspect of the present invention, there is provided a communication network comprising a plurality of a plurality of private branch exchange (PBX) nodes, each having a database for storing shared data for verification of authorized mobile stations when accessing the network, a plurality of wireless cell-site stations connected to the PBX nodes, and a mobile station for monitoring a downlink signal from a first cell-site station of a first PBX node, detecting a strong signal if the strength of the downlink signal falls below a threshold, transmitting a handover request message to a second cell-site station transmitting the strong signal. A second PBX node of the plurality of nodes, when receiving the message via the second cell-site station, establishes mobile's verification using data stored in the database of the second PBX node, transmits a handover grant message to the second cell-site station, transmits a command message to the first PBX node for a switchover to a link between the first and second PBX nodes, and connects the link to the second cell-site station.

According to a second aspect, the present invention provides a communications network comprising a plurality of private branch exchange (PBX) nodes each having a local database for storing data associated with mobile stations and a global database for storing verification data commonly shared by the PBX nodes, a plurality of wireless cell-site stations connected to the PBX nodes, and a mobile station having a mobile's address for operating in a wireless mode and a PBX extension number of one of the PBX nodes for operating in a PBX extension mode, the mobile station detecting a strong signal after the strength of a downlink signal falls below a predefined threshold during a wireless mode with a talking party of a first one of the PBX nodes via a first cell-site station and transmitting a handover request message containing a mobile's address to a second cell-site station which is transmitting the strong signal. A second one of the PBX nodes, when receiving the handover request message via the second cell-site station, determines a home PBX node of the mobile station from the mobile's address contained in the handover request message, acquires data associated with the mobile station from the local database of the home PBX node, identifies the first PBX node from the acquired data as a node from which the mobile station is moving, test the acquired data against verification data stored in the global database of the second PBX node to determine whether the mobile station is an authorized user, transmit a handover grant message to the second cell-site station if the mobile station is verified as an authorized user, transmit a command message to the first PBX node for a switchover from an old connection between the first cell-site station and the mobile's talking party to a new path from the mobile's talking party to a communication link between the first and second PBX nodes, and establish a path In the second PBX node between the communication link and the second cell-site station.

Preferably, the data stored in the local database includes data concerning identifications of the cell-site stations, and the second PBX node is arranged to acquire from the local data base of the home PBX node the identification of a cell-site station with which the mobile station is currently associated, transmit the acquired Identification of the cell-site station to the first PBX node with the command message, and update the local database of the home PBX node with an indication that the mobile station is served by the second cell-site station, rather than with the first cell-site station, when the path is established in the second PBX node.

BRIEF DESCRIPTION OF THE DRAWINGS

The present invention will be described in further detail with reference to the accompanying drawings, in which:

FIG. 2A is an illustration of a global database created in a memory of each PBX node for storing the same data commonly shared by all PBX nodes;

FIG. 2B is an illustration of a local database created in the memory of each PBX node for storing data specific to the home mobile stations of the PBX node;

FIG. 3 is a flowchart of the operation of a mobile station according to the present invention;

FIG. 4 is a flowchart of the operation of a PBX according to the present invention; and FIG. 5 is a view illustrating flow of data among PBX nodes during a handover operation.

DETAILED DESCRIPTION

Figure 1:
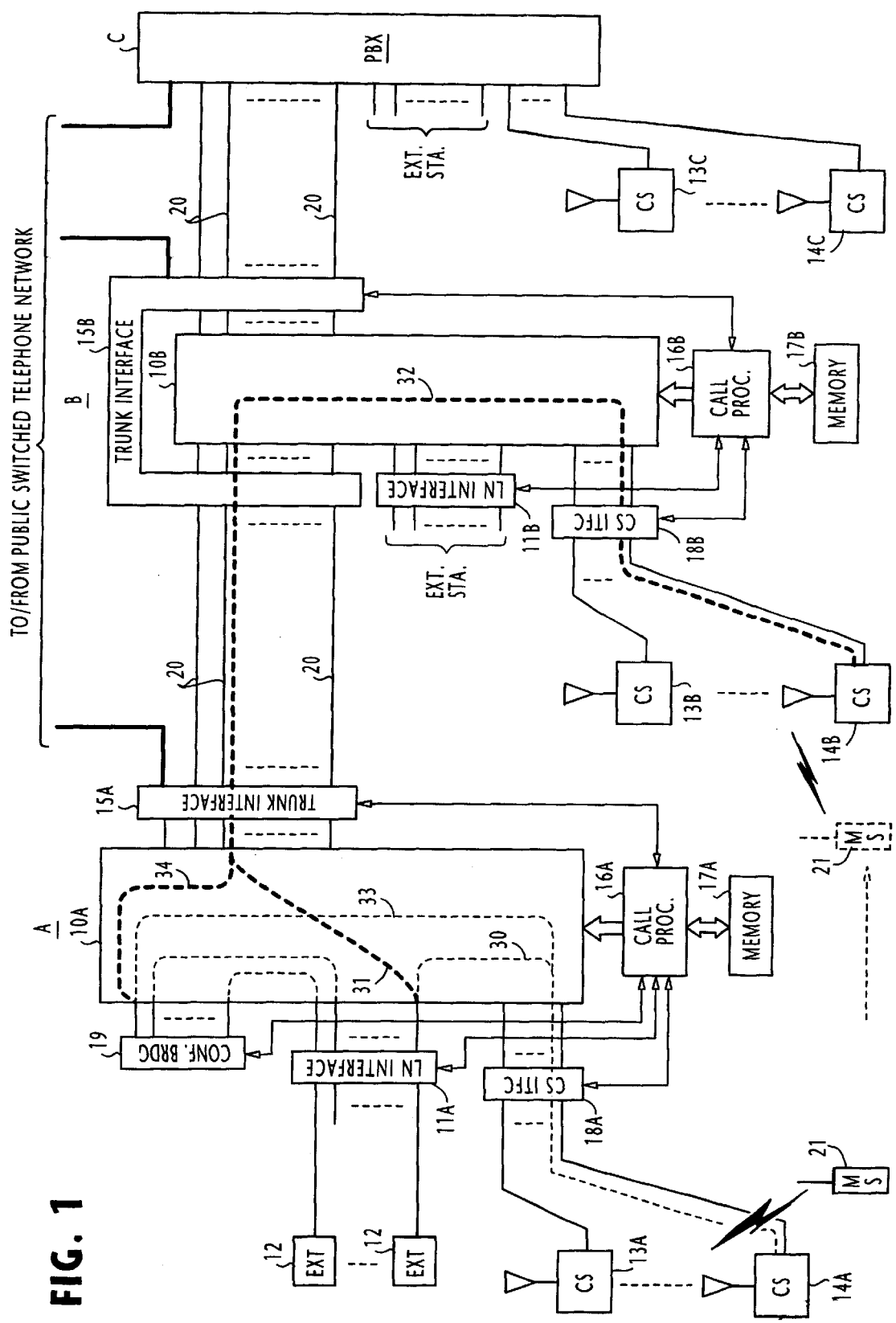
FIG. 1 is a block diagram of a mobile communication system of the present invention formed by a network of private branch exchanges.

Referring now to FIG. 1, there is shown a network of private branch exchanges (PBXs) of the present invention, each serving a plurality of wireless cell-site stations as well as a plurality of PBX extension stations.

For simplicity, the network is shown as comprising three PBX nodes A, B and C having same system identifiers. Each PBX node includes a line interface 11 for terminating PBX extension telephone or facsimile stations 12, a cell-site interface 18 for accommodating land-lines of cell-site stations 13, 14 and a trunk interface 15 for terminating inter-PBX dedicated digital speech and control channels 20 as well as exchange lines of a public switched telephone network Between the line interfaces 11, 18 and trunk interface 15 is a switching network 10 for establishing switched connections between PBX user stations under control of a call processor 16 in response to signaling messages from user stations via the line interface 11, cell site stations via the cell-site interface 18 and digital control channels via the trunk interface 15. Further associated with the call processor 16 is a memory 17.

Handheld mobile stations of the type known as Personal Handyphone System (PHS) are used to access the cell-site stations 13 and 14 of any PBX node. Each mobile station is identified by a mobile's address which is used when the mobile station is in a wireless mode and is also identified by a PBX extension number when the mobile station is within the premises of its home PBX node.

Mobile stations are accessed from the PBX nodes via cell-site stations using a common system identifier (SID) which globally identifies a group of PBX nodes forming a common network for mobile stations. Cell-site stations of the network form a number of groups (or communities) each identified by a PHS Community Number (PCN). Each cell-site station is uniquely identified by a PBX line number (PLN) that is a concatenation of a PCN, a CSN (Cell-Site Number) which identifies the physical location or networks wide line number of the appearance of a cell-site station at one of the line terminals of the associated switching network 10) and an ERN (Area Number which identifies a group of cell-site stations which are alerted simultaneously when an incoming call is received).

A conference bridge 19 may be provided in the PBX node A. This bridge is connected to the switching network 10A to establish a circuit that allows conference calls to access from a number of PBX user stations through the switching network 10 when a telephone conference is held.

As shown in FIG. 2A, each PBX node has a global database which is defined in the memory 17 for mapping a PBX line number (PLN) of each cell site station to corresponding identification numbers of PCN, ERN and CSN. The global database also defines a map indicating relationships between all mobile stations and their home PBX nodes. As shown in FIG. 28, a local database specific to each PBX node is also defined in the memory 17. The local database has a plurality of entries for home mobile stations of the PBX node. In each of the entries, the mobile's address (MA) of a home mobile station is mapped to the PCN identifier of the mobile station and the identifications ERN and CSN of a cell-site station with which the mobile station of the entry is currently establishing a wireless link By consulting the local database, each PBX node knows where its home mobile stations are currently located. The memory 17 also stores data concerning all connections of mobile stations currently established in its PBX node and location registration of these mobile stations.

The handover operation of the mobile station 21 will be described with the aid of the flowcharts of FIGS. 3 and 4 by assuming that the mobile station is moving around while communicating with a PBX extension telephone 12 via a path 30 established in the switching network 10A and approaching the cell-site station 14B of PBX node B. It is further assumed that the PBX node C is the home PBX node of mobile station 21.

When the call is in progress, the mobile station 21 is constantly monitoring the field strength of its downlink signal (step 41). If it falls below a predefined threshold level, flow proceeds to step 42 to start scanning the frequency spectrum in search of a strong signal. If the mobile station senses a strong signal coming from an adjacent cell-site station, the mobile station 21 stops the scanning operation (step 43). At step 44, the mobile station 21 determines the source of the strong signal by using the cell-site identifier CSN contained in the received strong signal and transmits a handover request message to the cell-site station 14B over a control channel to inform it of the mobile's address and waits for a channel assignment message.

On receiving the handover request message from mobile station 21, the cell-site station 14B retransmits it to the call processor 16B of PBX node B, which is the second node of the handover process with respect to the first PBX node A.

FIG. 4 illustrates the handover operation of the call processor of the second PBX node in response to the cell-site station 14B. When a handover request message is received from the cell-site station 14B (step 51), the call processor 16B proceeds to step 52 to identify the mobile's home PBX node C from its global database by using the mobile's address $MA_{21}$ of mobile station 21 contained in the handover request message (see also dotted line 71 in FIG. 5) and determine the PCN identification of the requesting cell-site station 14B from the global database by using the PBX line number $PLN_{14B}$ of the requesting cell-site station 14B (see dotted lines 72 and 73).

With the home PBX of mobile station 21 being identified, flow proceeds to step 53 where the second PBX node B transmits a request message to the home PBX node C to acquire from its local database the mobile's PCN, the $CSN_{14A}$ identification of the mobile's current cell-site station 14A and the mobile's current identification number $ERN_1$ (see dotted lines 74, 75 and 76).

Therefore, the second PBX node B recognizes from its global database that the cell-site station with which the mobile station 21 has previously established a link has a PBX line number $PLN_{4A}$, and so the PBX node A is first, or previous PBX node of the handover operation (see dotted lines 75 and 77).

Flow proceeds to decision step 54 where the call processor 16B termines whether the PCN of mobile station 21 is equal to the PCN of the requesting cell-site station 14B. If not, flow proceeds to the end of the routine. If they equal, it is determined that the mobile station is an authorized user terminal and flow proceeds from step 54 to step 55 to transmit a handover grant message to the requesting cell-site station 148. Cell-site station 14B responds to this grant message by selecting an idle speech channel and sends a channel assignment message to the mobile station 21.

In FIG. 3, the mobile station 21 responds to the channel assignment message from the cell-site station 14B (step 45) by storing the assigned channel number in memory (step 46) and waits for a switchover command message. If no channel assignment message is received within a predefined time-out period, flow proceeds from step 45 to the end of the routine.

Returning to FIG. 4, since the second PBX node B knows that the first PBX is the node A, the call processor 168 selects an idle inter-PBX digital speech channel 20 between nodes A and B (step 56). At step 57, the PBX node B sends a command message through a digital control channel to the first PBX node A, containing the mobile's address $MA_{21}$ (see dotted line 78, FIG. 5) and the identifier of the selected digital speech channel and an indication commanding the node's A call processor 16A to set up a new path 31 in the switching network 10A between the mobile's talking party 12 and the selected digital speech channel 20, release the old connection 30 between the cell-site station 14A and the mobile's talking party 12 and update its location registration of mobile station 21 in the memory 17A.

Flow proceeds to step 58 where the call processor 168 establishes a path 32 in the switching network 10B between the cell-site station 148 and the selected digital channel 20, and sends a switchover command message, at step 59, to the requesting cell-site station 14B. At step 60, the call processor 16B establishes the location registration of mobile station 21 in the memory 17B and terminates its routine. The switchover command message is retransmitted from the cell-site station 14B to the mobile station 21.

Reverting to FIG. 3 again, the mobile station 21 receives the switchover command message retransmitted from the cell-site station 14B at step 47 and proceeds to step 48 to switch its communication path to the channel assigned by the second cell-site station 14B, thus completing a new communication path between the mobile's current talking party in the PBX node A and the mobile station 21 indicated by a broken line.

In FIG. 4, flow proceeds from step 60 to step 61 where the second PBX node B informs the home PBX node of the mobile's address $MA_{21}$, the address $CSN_{14B}$ of the new cell-site station 14B of mobile station 21 and a new alert area number $ERN_2$ obtained from the global database of node B in order to update its entry for the mobile station 21 (see dotted lines 79, 80).

If the mobile station 21 is in a conference mode when it approaches the cell-site station 148, using a communication path 33 established in the switching network 10A, the call processor 16B is notified of one of the conference bridge line numbers (CBN) from the home node (step 53) and commands the first node A to establish a new conference path 34 between the conference bridge 19 and the selected digital speech channel 20 and clear the old connection 33 (step 57).

What is claimed is:

1. A communications network comprising:
    a plurality of private branch exchange (PBX) nodes each having a local database for storing data associated with mobile stations and a global database for storing verification data commonly shared by said PBX nodes;
    a plurality of wireless cell-site stations connected to said PBX nodes; and
    a mobile station having a mobile's address for operating in a wireless mode and a PBX extension number of one of said PBX nodes for operating in a PBX extension mode, the mobile station detecting a strong signal after the strength of a downlink signal falls below a predefined threshold during a wireless mode with a talking party of a first one of said PBX nodes via a first cell-site station and transmitting a handover request message containing a mobile's address to a second cell-site station which is transmitting the strong signal,
    a second one of said PBX nodes, when receiving said handover request message via said second cell-site station, determining a home PBX node of the mobile station from the mobile's address contained in the handover request message, acquiring data associated with said mobile station from the local database of the home PBX node, identifying the first PBX node from the acquired data as a node from which the mobile station is moving, testing the acquired data against verification data stored in the global database of the second PBX node to determine whether the mobile station is an authorized user, transmitting a handover grant message to said second cell-site station if the mobile station is verified as an authorized user, transmitting a command message to the first PBX node for a switchover from an old connection between the first cell-site station and the mobile's talking party to a new path from the mobile's talking party to a communication link between said first and second PBX nodes, and establishing a path in the second PBX node between the communication link and the second cell-site station.

2. The communications network of claim 1, wherein said local database of each PBX node is arranged to store identifications of said cell-site stations with which mobile stations are currently associated, and wherein said second PBX node is arranged to;
    acquire from said local data base thereof the identification of a cell-site station with which the mobile station is currently associated,
    transmit the acquired identification of the cell-site station to the first PBX node with said command message, and
    update the local database of the home PBX node with an indication that the mobile station is associated with the second cell-site station, rather than with the first cell-site station, when said path is established in the second PBX node.

3. The communications network of claim 1, wherein said second PBX node is arranged to select one of a plurality of idle communication links between said first and second PBX nodes when said mobile station is verified as an authorized user and transmit an identification of the selected idle communication link to the first PBX node with said command message.

4. A method of performing a handover operation in a communications network comprising a plurality of private branch exchange (PBX) nodes each having a local database for storing data associated with mobile stations and a global database for storing verification data commonly shared by said PBX nodes, a plurality of cell-site stations connected to said PBX nodes for establishing a wireless link between each cell-site station and a mobile station located within an area covered by the cell-site station, said mobile station having a mobile's address for operating in a wireless mode and a PBX extension number of one of the PBX nodes when operating as a PBX extension, the method comprising the steps of:
    a) detecting a strong signal after the strength of a downlink signal falls below a predefined threshold;
    b) transmitting a handover request message containing a mobile's address from the mobile station to a second one of said cell-site stations which is transmitting the strong signal;
    c) receiving said handover request message at said second PBX via said second cell-site station and determining a home PBX node of the mobile station from the mobile's address contained in the handover request message;
    d) acquiring data associated with said mobile station from the local database of the home PBX node, and identifying the first PBX node from the acquired data as a node from which the mobile station is moving;

e) testing the acquired data against verification data stored in the global database of the second PBX node to determine whether the mobile station is an authorized user, and transmitting a handover grant message to said second cell-site station if the mobile station is verified as an authorized user;

f) transmitting a command message to the first PBX node for a switchover from an old connection between the first cell-site station and the mobile's talking party to a new path from the mobile's talking party to a communication link between said first and second PBX nodes; and g) establishing a path in the second PBX node between the communication link and the second cell-site station.

5. The method of claim 4, wherein said data stored in said local database includes data concerning identifications of said cell-site stations with which mobile stations are currently establishing wireless links, wherein step (c) further comprises acquiring from said local database the identification of a cell-site station with which the mobile station is currently associated, wherein step (f) further comprises inserting the acquired identification of the cell-site station to said command message, further comprising the step of updating the local database of said home PBX node with an indication that the mobile station is associated with the second cell-site station, rather than with the first cell-site station, when said path is established in the second PBX node.

6. The method of claim 4, wherein step (d) further comprises selecting one of a plurality of idle communication links between said first and second PBX nodes when said mobile station is verified as an authorized user and step (f) further comprises transmitting an identification of the selected idle communication link to the first PBX node with said command message.

* * * * *

UNITED STATES PATENT AND TRADEMARK OFFICE
CERTIFICATE OF CORRECTION

PATENT NO. : 6,330,448 B1
DATED : December 11, 2001
INVENTOR(S) : Kiyokazu Otsuka and Yoshio Itagaki It is certified that error appears in the above-identified patent and that said Letters Patent is hereby corrected as shown below:

<u>Column 2,</u>
Line 30, delete "In" insert -- in --;
Line 38, delete "Identification" insert -- identification --;

<u>Column 3,</u>
Line 52, delete "28" insert -- 2B --

<u>Column 5,</u>
Line 12, delete "168" insert -- 16B --;
Line 14, delete "148" insert -- 14B --;
Line 37, delete "148" insert -- 14B --;

Signed and Sealed this

Twenty-eighth Day of May, 2002

Attest:

JAMES E. ROGAN
Attesting Officer     Director of the United States Patent and Trademark Office